(12) United States Patent
Lee et al.

(10) Patent No.: US 8,703,322 B2
(45) Date of Patent: Apr. 22, 2014

(54) BATTERY CARTRIDGE AND BATTERY MODULE CONTAINING THE SAME

(75) Inventors: Jin Kyu Lee, Busan (KR); Kwanyong Kim, Daejeon (KR); Jongmoon Yoon, Daejeon (KR); Jaeseong Yeo, Daejeon (KR); Yongshik Shin, Daejeon (KR); Hee Soo Yoon, Daejeon (KR); BumHyun Lee, Seoul (KR); Dal Mo Kang, Daejeon (KR)

(73) Assignee: LG Chem, Ltd. (KR)

( * ) Notice: Subject to any disclaimer, the term of this patent is extended or adjusted under 35 U.S.C. 154(b) by 239 days.

(21) Appl. No.: 13/125,860

(22) PCT Filed: Oct. 22, 2009

(86) PCT No.: PCT/KR2009/006123
§ 371 (c)(1),
(2), (4) Date: Sep. 14, 2011

(87) PCT Pub. No.: WO2010/050697
PCT Pub. Date: May 6, 2010

(65) Prior Publication Data
US 2011/0318623 A1 Dec. 29, 2011

(30) Foreign Application Priority Data
Oct. 30, 2008 (KR) ........................ 10-2008-0106810

(51) Int. Cl.
*H01M 2/18* (2006.01)
(52) U.S. Cl.
USPC ............. 429/138; 429/96; 429/135; 429/163; 429/172; 429/185; 429/186

(58) Field of Classification Search
CPC ............ H01M 2/1061; H01M 10/052; H01M 2/0287; H01M 2/1077; Y02T 10/7011; Y02E 60/122
USPC ............. 429/96–99, 121, 123, 135–138, 152, 429/154, 156, 163, 177, 185–186, 148–149, 429/159–161, 172–173
See application file for complete search history.

(56) References Cited

U.S. PATENT DOCUMENTS

| | | |
|---|---|---|
| 2005/0042511 A1 | 2/2005 | Kaneta |
| 2006/0183017 A1 | 8/2006 | Kanai |

(Continued)

FOREIGN PATENT DOCUMENTS

| | | |
|---|---|---|
| JP | 08-321329 | 12/1996 |
| JP | 2004-014125 A | 1/2004 |

(Continued)

OTHER PUBLICATIONS

International Search Report, PCT/KR2009/006123, dated May 11, 2010.

*Primary Examiner* — Patrick Ryan
*Assistant Examiner* — Ben Lewis
(74) *Attorney, Agent, or Firm* — Lerner, David, Littenberg, Krumholz & Mentlik, LLP

(57) ABSTRACT

Disclosed herein is a battery cartridge having a plate-shaped battery cell mounted therein, wherein the battery cartridge includes a pair of plate-shaped frames configured to fix opposite sides of the battery cell at the edge thereof in a state in which the sides of the battery cell are open, and each of the frames is provided at the inside thereof, disposed in contact with the edge of the battery cell, with an elastic pressing member configured to press the edge of the battery cell.

16 Claims, 3 Drawing Sheets

(56) References Cited

U.S. PATENT DOCUMENTS

| | | | |
|---|---|---|---|
| 2006/0214641 A1* | 9/2006 | Cho .............................. 320/150 |
| 2006/0286450 A1* | 12/2006 | Yoon et al. .................... 429/180 |
| 2007/0207377 A1* | 9/2007 | Han et al. ...................... 429/162 |

FOREIGN PATENT DOCUMENTS

| | | |
|---|---|---|
| JP | 2004-031281 A | 1/2004 |
| JP | 2004-055169 A | 2/2004 |
| JP | 2004-055348 A | 2/2004 |
| JP | 2004055348 A | 2/2004 |
| JP | 2005-116278 A | 4/2005 |
| JP | 2005-116457 A | 4/2005 |
| JP | 2005116278 A | 4/2005 |
| JP | 2005-122927 A | 5/2005 |
| JP | 2005122927 A | 5/2005 |
| JP | 2008-103239 A | 5/2008 |
| KR | 20070025391 A | 3/2007 |

* cited by examiner

BATTERY CARTRIDGE AND BATTERY MODULE CONTAINING THE SAME

CROSS REFERENCE TO RELATED APPLICATIONS

The present application is a national phase entry under 35U.S.C. §371 of International Application No. PCT/KR2009/006123, filed Oct. 22, 2009, published in Korean, which claims priority from Korean Patent Application No. 10-2008-0106810, filed Oct. 30, 2008. The disclosures of said applications are incorporated by reference herein.

TECHNICAL FIELD

The present invention relates to a battery cartridge and a battery module including the same, and, more particularly, to a battery cartridge having a plate-shaped battery cell mounted therein, wherein the battery cartridge includes a pair of plate-shaped frames configured to fix opposite sides of the battery cell at the edge thereof in a state in which the sides of the battery cell are open, and each of the frames is provided at the inside thereof, disposed in contact with the edge of the battery cell, with an elastic pressing member configured to press the edge of the battery cell and a battery module including a battery cell mounted in the battery cartridge.

BACKGROUND ART

As mobile devices have been increasingly developed, and the demand for such mobile devices has increased, the demand for secondary batteries has also sharply increased. Among such secondary batteries is a lithium secondary battery having high energy density and operating voltage and excellent preservation and service-life characteristics, which has been widely used as an energy source for various electronic products as well as for the mobile devices.

Based on their external and internal structures, secondary batteries are generally classified into a cylindrical battery, a prismatic battery, and a pouch-shaped battery. Especially, the prismatic battery and the pouch-shaped battery, which can be stacked with high integration and have a small width to length ratio, have attracted considerable attention.

Also, the secondary batteries have attracted considerable attention as an energy source for electric vehicles and hybrid electric vehicles, which have been developed to solve problems, such as air pollution, caused by existing gasoline and diesel vehicles using fossil fuel. As a result, the secondary batteries are being applied to an increasing number of applications owing to advantages thereof, and, in the future, the secondary batteries are expected to be applied to even more applications and products.

As applications and products, to which the secondary batteries are applicable, are increased, kinds of batteries are also increased so that the batteries can provide powers and capacities corresponding to the various applications and products. In addition, there is a strong need to reduce the size and weight of the batteries applied to the corresponding applications and products.

For example, small-sized mobile devices, such as mobile phones, personal digital assistants (PDAs), digital cameras, and laptop computers, use one or several small-sized, lightweight battery cells for each device according to the reduction in size and weight of the corresponding products. On the other hand, middle or large-sized devices, such as electric bicycles and hybrid electric vehicles, use a battery module (which may also be referred to as a "middle or large-sized battery pack") having a plurality of battery cells electrically connected with each other because high power and large capacity are necessary for the middle or large-sized devices. The size and weight of the battery module is directly related to an accommodation space and power of the corresponding middle or large-sized device. For this reason, manufacturers are trying to manufacture small-sized, lightweight battery modules.

Meanwhile, when battery cells are connected to each other, in a state in which the battery cells are stacked, so as to increase the capacities of battery modules, the dissipation of heat from the battery cells becomes serious. For lithium secondary batteries, heat is generated from the lithium secondary batteries during the charge and discharge of the lithium secondary batteries. If the heat is not effectively removed from the lithium secondary batteries, the heat accumulates in the respective lithium secondary batteries, resulting in the deterioration of the lithium secondary batteries, and the safety of the lithium secondary batteries is greatly lowered. In particular, for a battery requiring high-speed charging and discharging characteristics as in a power source for electric vehicles and hybrid electric vehicles, a large amount of heat is generated from the battery when the battery instantaneously provides high power.

Also, a pouch-shaped battery cell, widely used as a unit cell of each of the battery modules, is configured to have a structure in which an electrode assembly is mounted in a pouch-shaped battery case formed of laminate sheets, and the edge of the battery case is thermally welded by applying pressure to the edge of the battery case while heating the edge of the battery case. However, the safety of such a battery cell structure is relatively low. Specifically, sealing force of the pouch-shaped battery cell is decided based upon coupling force of the edge of the battery case thermally welded. When high pressure is generate in the battery cell due to deterioration of the battery cell caused by long-term use of the battery cell or the abnormal operation of the battery cell, the thermally welded edge of the battery case is widened with the result that gas and an electrolyte may leak from the battery cell. Since the electrolyte contains a combustible material, the battery call may easily catch fire.

In addition, the laminate sheets constituting the battery case has lower mechanical strength than a metal container. Also, each of the laminate sheets has a polymer material exhibiting low thermal conductivity coated on the surface thereof with the result that it is difficult to effectively lower the overall temperature of the battery cell.

In connection with this matter, for example, Japanese Patent Application Publication No. 2004-031281 discloses a cooling structure of an electrode stacked type battery configured to have a structure in which a pair of laminate films each including a metal layer and a resin layer are disposed at opposite sides of an electrode assembly manufactured by stacking a cathode and an anode in a state in which a separator is disposed between the cathode and the anode, and edges of the laminate films are fixed to each other in a tight contact manner, wherein a pair of pushing members push opposite sides of the electrode stacked type battery, the pushing members protrude more outward than the edge of the electrode stacked type battery, the protruding regions of the pushing members function as heat dissipation members which dissipate heat generated from the electrode stacked type battery.

However, the above-mentioned technology has problems in that it is necessary to manufacture a battery cell case in a complicated structure and mount the manufactured battery cell case into a battery, which is troublesome. In addition, the battery cell may be exposed to water or air with the result that the battery cell may be damaged. Also, the above-mentioned technology is limited to a structure in which an air cooling type cooling fin is applied upon stacking of batteries to manufacture a battery module with the result that it is difficult to standardize a fundamental battery module.

The battery case sheets, each of which is configured in a laminate structure including an outer covering layer, a metal blocking layer and an inner sealant layer, are sealed by thermal welding. However, the ends (cut edges) of the laminate sheets are exposed to the outside. As a result, insulation resistance of the battery cell may be lowered due to the exposed metal blocking layers, or external moisture and air may permeate the battery through the sealed portion.

Exposure of the metal blocking layers from the laminate sheets or electrical connection of the exposed metal blocking layers to other regions of the battery may be referred to as destruction (or deterioration) of insulation resistance. The deterioration of insulation resistance lowers the safety and service-life characteristics of the battery, which is not preferable. Also, moisture, introduced into the battery through the sealed portion exposed from the ends of the laminate sheets, reacts to an electrolyte of the battery with the result that gas is generated and the deterioration of the battery is accelerated, lowering the safety and service-life characteristics of the battery, which is not also preferable.

Therefore, there is a high necessity for technology that is capable of fundamentally solving the above-mentioned problems.

DISCLOSURE

Technical Problem

Therefore, the present invention has been made to solve the above problems, and other technical problems that have yet to be resolved.

Specifically, it is an object of the present invention to provide a battery cartridge configured so that the edge of a battery cell is fixed by the plate-shaped frames in a state in which the sides of the battery cell are open, and elastic pressing members are mounted at the insides of the frames, thereby enabling the battery cell, having low mechanical strength, to be stably mounted while exhibiting high heat dissipation efficiency and maintaining sealing force even when high pressure is generated in the battery cell.

It is another object of the present invention to provide a battery cartridge configured to prevent external moisture from permeating the battery cell while maintaining insulation resistance, thereby improving safety and service-life characteristics of the battery cell.

It is a further object of the present invention to provide a battery module to which various heat dissipation structures are applicable.

Technical Solution

In accordance with one aspect of the present invention, the above and other objects can be accomplished by the provision of a battery cartridge having a plate-shaped battery cell mounted therein, wherein the battery cartridge includes a pair of plate-shaped frames configured to fix opposite sides of the battery cell at the edge thereof in a state in which the sides of the battery cell are open, and each of the frames is provided at the inside thereof, disposed in contact with the edge of the battery cell, with an elastic pressing member configured to press the edge of the battery cell.

In the battery cartridge according to the present invention, therefore, only the edge of the battery cell is fixed by the plate-shaped frames, thereby achieving effective heat dissipation through the exposed sides of the battery cell. Consequently, it is possible to increase mechanical strength of the battery module while maximally restraining the increase in size of the battery module using the battery cartridge. In addition, the edge of the battery cell is effectively pressed by the elastic pressing members mounted at the insides of the respective frames to securely maintain a sealed state, thereby preventing the sealed state of the battery cell from being released due to internal conditions of the battery cell, such as high pressure generated in the battery cell, and external conditions of the battery cell, such as high temperature and high humidity.

The battery cell is generally configured in the shape of a plate. However, the structure of the battery cell is not particularly restricted so long as the edge of the battery cell can be fixed by the frames. In this structure, the battery cell may include a sealed portion formed at at least a portion of the edge thereof, and the elastic pressing member may be mounted on each of the frames at a position corresponding to at least the sealed portion.

Preferably, the battery cell includes a sealed portion formed throughout the edge by thermal welding, and the elastic pressing member is mounted on each of the frames in the shape of a closed rectangle so that the elastic pressing member can correspond to the thermally welded sealed portion.

Consequently, the relatively weak edge sealed portion is effectively pressed by the elastic pressing members mounted at the insides of the respective frames, thereby maintaining high sealability under various conditions or circumstances. Also, the elastic pressing members increase the fixing force of the battery cell to the respective frames. For this reason, it is not necessary to use an additional member to fix the battery cell.

For example, the battery cell may have an electrode assembly mounted in a battery case formed of laminate sheets, and the laminate sheets may be thermally welded so that the edge of the battery cell is sealed.

Each of the laminate sheets may be a stacked type sheet including a resin layer and a metal layer. For example, each of the laminate sheets may be a metal laminate sheet including an outer covering layer, a metal blocking layer and an inner sealant layer. The outer covering layer may be made of a material exhibiting high durability. Preferably, the outer covering layer is made of a polyethylene terephthalate (PET) resin or a nylon resin. The metal blocking layer may be made of a material exhibiting a moisture and air blocking property. Preferably, the metal blocking layer is made of aluminum. The inner sealant layer may be made of a material which is inactive to an electrolyte and thermally weldable at a predetermined temperature range. Preferably, the inner sealant layer is made of cast polypropylene.

Generally, one battery cell is mounted between the plate-shaped frames. According to circumstances, however, two or more battery cells may be mounted between the plate-shaped frames.

The material for the elastic pressing members mounted at the insides of the frames is not particularly restricted so long as the elastic pressing members exhibit high elastic pressing force when the elastic pressing members are pressed. Preferably, each of the elastic pressing members is formed of elastic polymer resin. Such a polymer resin may be a material that is capable of exhibiting high elastic force or may have a structure or shape that is capable of exhibiting high elastic force. A representative example of the former may be rubber, and a representative example of the latter may be a foamed polymer resin.

The elastic pressing members may be mounted on the respective frames in various ways. Preferably, each of the frames is provided at the inside thereof with a groove, in which the elastic pressing member is mounted, so that the elastic pressing members can be more efficiently mounted on the respective frames.

The length of each of the elastic pressing members may be substantially equal to or greater than the length to cover the sealed portion of the edge, i.e. the length of the sealed portion. On the other hand, each of the elastic pressing members may have a width equivalent to 10 to 80% of the width of each of the frames. If the width of each of the elastic pressing members is too small as compared with the width of each of the frames, an effect obtained by mounting the elastic pressing members to the frames may not be exhibited. On the other hand, if the width of each of the elastic pressing members is too large as compared with the width of each of the frames, the elastic pressing members, which are elastically deformed when the elastic pressing members are pressed, may press an electrode assembly receiving part or may protrude out of the frames, which is not preferable. Of course, therefore, the width of each of the elastic pressing members may exceed the above defined range unless the above problems are caused.

In a preferred example, the width of each of the elastic pressing members may be set so that the end of the sealed portion is sealed from the outside, i.e. is not exposed to the outside, by the elastic pressing members.

In this structure, the end of the sealed portion, i.e. the metal laminate sheets, is located between the elastic pressing member of one of the frames and the elastic pressing member of the other frame when the battery case is formed of the metal laminate sheets, each of which includes the outer covering layer, the metal blocking layer and the inner sealant layer as previously described. Consequently, it is possible to prevent deterioration or destruction of insulation resistance and to prevent external moisture from permeating the battery through the exposed end of the sealed portion, thereby improving the safety and life service-life characteristics of the battery.

According to circumstances, each of the frames may also be provided at the outside thereof with an elastic pressing member. In a case in which a plurality of battery cartridges, in each of which a battery cell is mounted, are stacked in a state in which heat dissipation members are disposed between the respective battery cartridges, the elastic pressing members mounted at the outsides of the frames increase structural stability of the battery cartridge stack and, in addition, enable the heat dissipation members to be effectively fixed to the battery cartridge stack.

Each of the frames may have one or more coupling through holes so that the coupling between the frames or the coupling between the cartridges is easily performed. Predetermined coupling members may be inserted through the coupling through holes to couple the frames to each other or coupled the stacked cartridges to each other.

The frames may be made of various materials. Preferably, the frames are made of an insulative material or a material upon which insulative surface treatment is carried out. A representative example of the former may be a plastic resin, and a representative example of the latter may be a metal material having an insulative material coated on the surface thereof. However, the material for the frames is not limited to the above materials.

Meanwhile, in a case in which a battery module having high power and/or large capacity is needed according to purpose of use, it is necessary to provide a structure in which a plurality of battery cells are stacked. In accordance with another aspect of the present invention, therefore, there is provided a battery module formed by stacking two or more battery cartridges.

In the above structure, the battery cartridges have coupling through holes, through which coupling members are inserted to couple the stacked battery cartridges to each other, as previously described. Consequently, it is possible to easily couple the battery cartridges to each other.

Also, battery modules constituting a battery pack require higher heat dissipation property to secure safety. Consequently, the battery module according to the present invention may further include a heat dissipation member disposed between the battery cartridges, thereby achieving effective heat dissipation of the battery cells.

The heat dissipation member may be formed in the shape of a plate, and at least a portion of the heat dissipation member may be exposed outward from the stacked battery cartridges. That is, a portion of the heat dissipation member is exposed outward from the battery cartridge stack with the result that heat generated from the battery cells is transferred to the heat dissipation member disposed between the battery cartridges and is effectively removed through the portion of the heat dissipation member exposed outward from the battery cartridge stack. The portion of the heat dissipation member disposed between the stacked battery cartridges may have a size to completely cover the interface between the battery cartridges. Alternatively, the portion of the heat dissipation member disposed between the respective battery cartridges may have a size to partially cover the interface between the respective battery cartridges.

The structure of the heat dissipation member is not particularly restricted so long as the heat dissipation member is disposed between the respective battery cartridges in a state in which a portion of the heat dissipation member is exposed outward from the battery cartridges. For example, the heat dissipation member may be an air cooling type cooling fin or a water cooling type cooling plate. Consequently, the battery module according to the present invention may be configured in an air cooling structure or a water cooling structure as needed.

In a case in which elastic pressing members are mounted to the outsides of frames constituting the battery cartridges, the heat dissipation member disposed between the battery cartridges is effectively fixed by the elastic pressing members.

The battery module according to the present invention is preferably used as a power source for devices which require high power and large capacity and to which various kinds of external force, such as vibration and impact, are applied, e.g., a power source for electric vehicles, hybrid electric vehicles, or plug-in hybrid electric vehicles.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
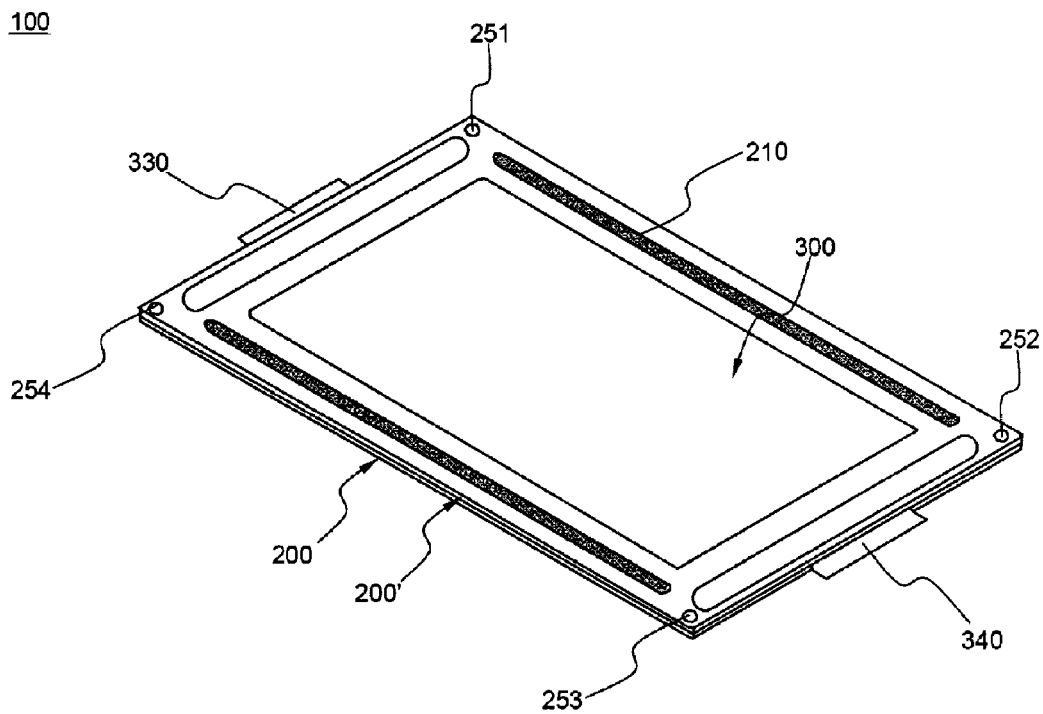
FIG. 1 is a plan view typically illustrating a battery cartridge according to an embodiment of the present invention.

FIG. 1 is a plan view typically illustrating a battery cartridge according to an embodiment of the present invention.

Referring to FIG. 1, a battery cartridge 100 has a plate-shaped battery cell 300 mounted therein, and electrode terminals 330 and 340 of the battery cell 300 protrude outward from the battery cartridge 100.

The battery cartridge 100 includes a pair of plate-shaped frames 200 and 200' configured to fix opposite sides of the battery cell 300 at the edge thereof in a state in which the opposite sides of the battery cell 300 are open.

The respective frames 200 and 200' are provided at the outsides thereof with elastic pressing members 210, which extend in the longitudinal direction of the respective frames 200 and 200' so that the elastic pressing members 210 are parallel to each other. Also, the respective frames 200 and 200' are provided at the insides thereof with elastic pressing members (not shown) configured to press the edge of the battery cell 300, which will be described below in detail with reference to FIG. 2.

The respective frames 200 and 200' are provided at the corners thereof with coupling through holes 251, 252, 253 and 254.

Figure 2:
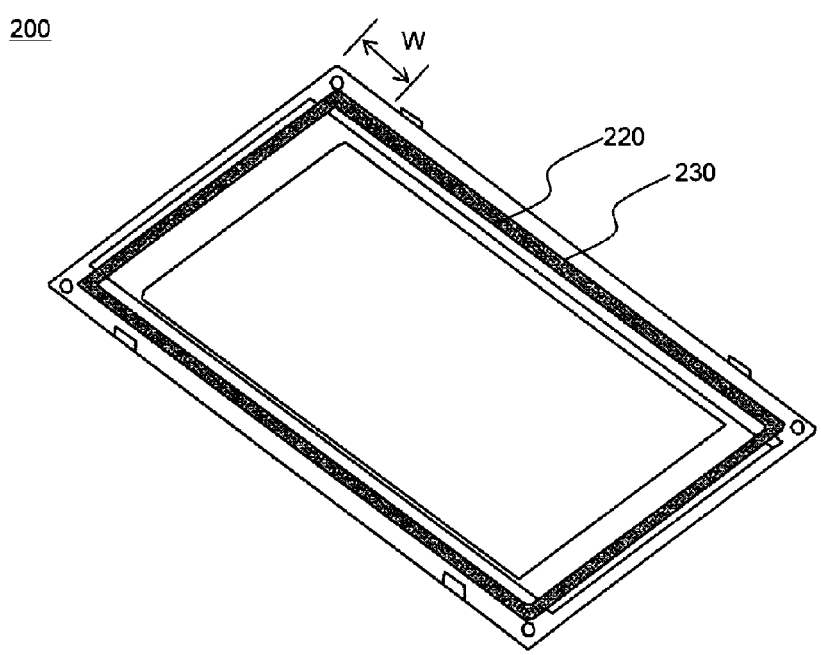
FIG. 2 is a plan view typically illustrating the inside of a plate-shaped frame according to an embodiment of the present invention.

FIG. 2 is a plan view typically illustrating the inside of a plate-shaped frame according to an embodiment of the present invention.

Referring to FIG. 2, the plate-shaped frame 200 is provided at the inside thereof with an elastic pressing member 220 which is formed in the shape of a closed rectangle.

The elastic pressing member 220 is mounted in a groove 230 formed at the frame 200.

When the frames 200 and 200' (see FIG. 1) are pressed to each other in a state in which a battery cell is mounted between the frames 200 and 200', the elastic pressing members 220 may apply elastic pressing force to the edge of the battery cell.

The width of the elastic pressing member 220 is less than the width W of the frame 200. Preferably, the width of the elastic pressing member 220 is set so that ends of laminate sheets 310 (see FIG. 3) of the battery cell are sealed from the outside by the elastic pressing member 220. Since the ends of the laminate sheets 310 (see FIG. 3) are not exposed to the outside, it is possible to prevent deterioration or destruction of insulation resistance and to prevent external moisture from permeating the battery cell through the ends of the laminate sheets.

Figure 3:
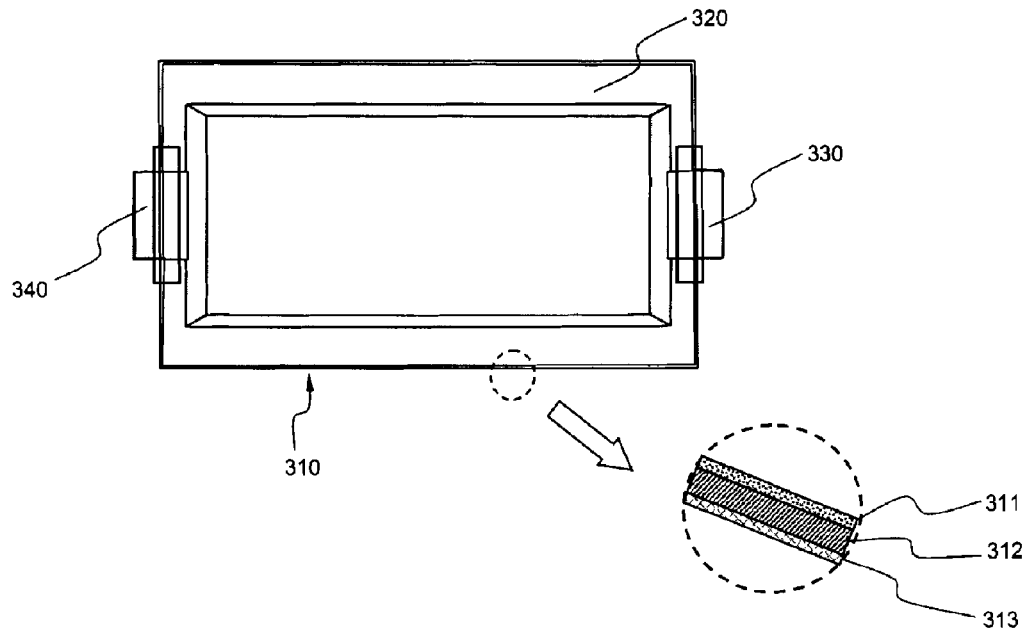
FIG. 3 is a plan view typically illustrating a plate-shaped battery cell.

FIG. 3 is a plan view typically illustrating a plate-shaped battery cell.

Referring to FIG. 3, the battery cell 300 has an electrode assembly (not shown) mounted in a battery case formed of laminate sheets 310. A sealed portion 320 formed by thermally welding the laminate sheets 310 is located over the edge of the battery cell 300.

Each of the laminate sheets 310 of the battery cell 300 includes an outer covering layer 311, a metal blocking layer 312 and an inner sealant layer 313. The edges of the laminate sheets 310 are thermally welded, in a state in which the electrode assembly (not shown) is placed between the laminate sheets 310, to manufacture the battery cell. For easy understanding, an enlarged view of a dotted line circle of FIG. 3 illustrates the sectional shape of one of the laminate sheets before thermal welding.

The electrode terminals 330 and 340, electrically connected to the electrode assembly (not shown), protrude outward from the upper end and the lower end of the battery case formed of the laminate sheets 310.

Figure 4:
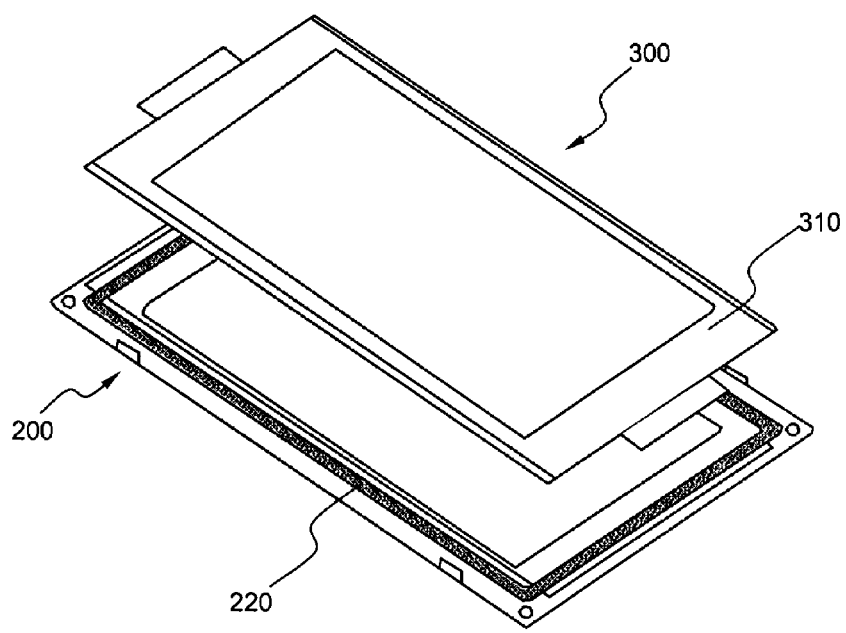
FIG. 4 is a plan view typically illustrating a plate-shaped frame and a battery cell according to an embodiment of the present invention.

FIG. 4 is a plan view typically illustrating a plate-shaped frame and a battery cell according to an embodiment of the present invention.

Referring to FIG. 4 together with FIG. 1, the elastic pressing member 220 is mounted at the inside of the frame 200 disposed in contact with the sealed portion 310 of the battery cell 300. That is, the elastic pressing member 220 is mounted on the frame 200 at a position corresponding to the sealed portion 310 disposed throughout the edge of the battery cell 300. During an assembling process, therefore, the elastic pressing member 220 comes into contact with the sealed portion 310 of the battery cell 300. As a result, the sealed portion 310 formed at the edge of the battery cell 300 comes into tight contact with the elastic pressing member 220 disposed at the inside of the frame 200, thereby achieving a stably mounted state and maximizing sealability of the sealed portion 310.

Figure 5:
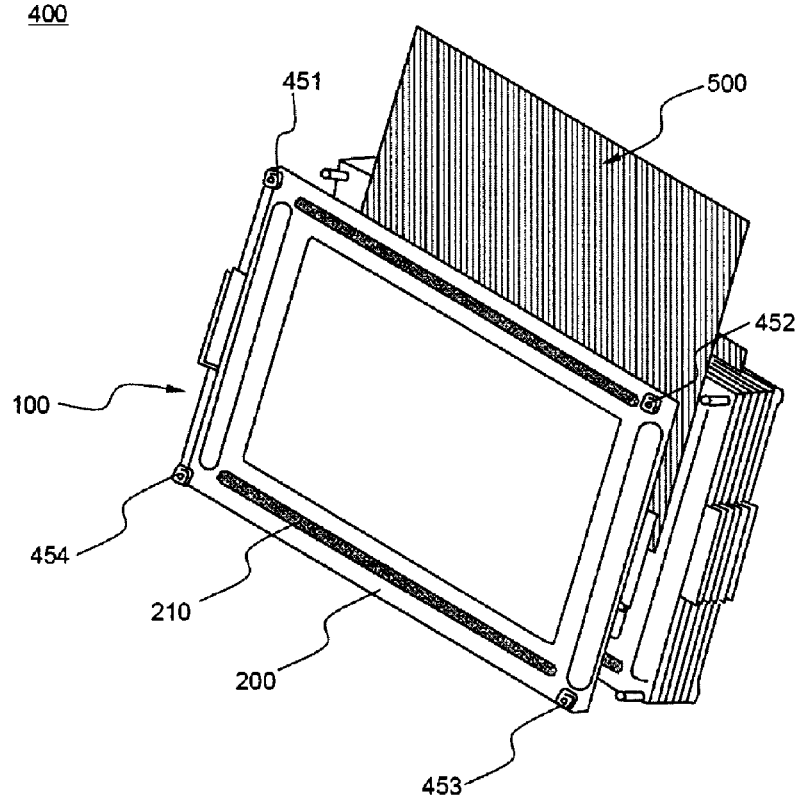
FIG. 5 is a perspective view illustrating a battery module configured so that heat dissipation members are disposed respectively between battery cartridges, one of which is shown in FIG. 1.

FIG. 5 is a perspective view illustrating a battery module 400 configured so that heat dissipation members 500 are disposed respectively between battery cartridges 100, one of which is shown in FIG. 1.

Referring to FIG. 5, each of the heat dissipation members 500 is formed in the shape of a plate. Each of the heat dissipation members 500 may be implemented by an air cooling type cooling fin. The heat dissipation members 500 are disposed between the respective battery cartridges 100. The heat dissipation members 500 may be disposed at all of the interfaces between the respective battery cartridges 100. Alternatively, the heat dissipation members 500 may be disposed at some of the interfaces between the respective battery cartridges 100.

The battery module 400 is manufactured by stacking the battery cartridges 100 in a state in which the heat dissipation members 500 are disposed between the respective battery cartridges 100 and inserting coupling members 451, 452, 453 and 454 through coupling through holes (not shown) formed at the respective battery cartridges 100.

The elastic pressing members 210 mounted at the outsides of the frames 200 of the respective battery cartridges 100 assist the heat dissipation members 500 to be stably mounted and fixed to the corresponding frames 200.

Figure 6:
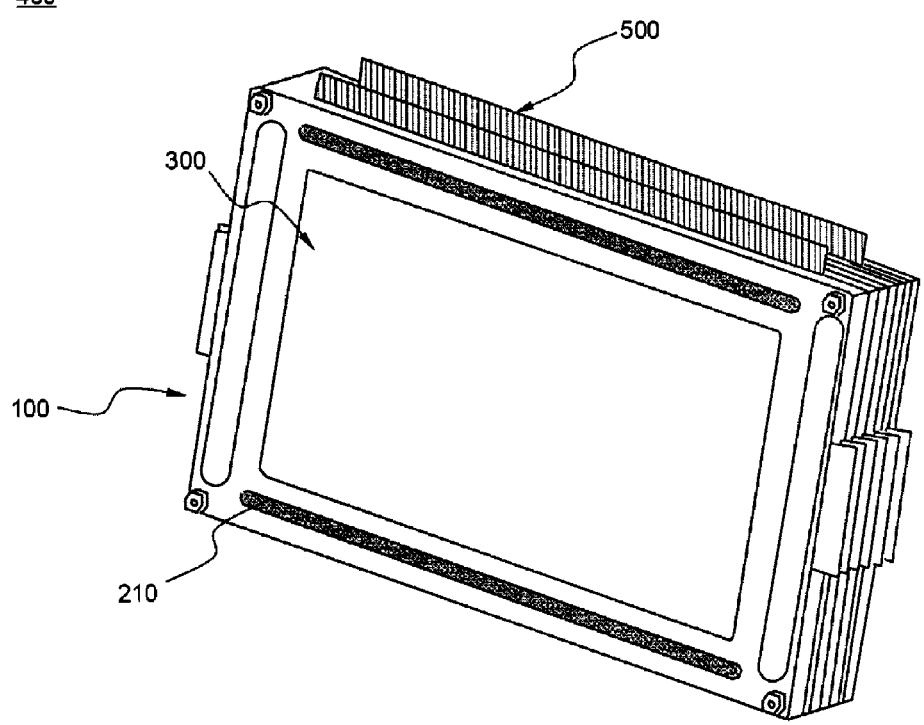
FIG. 6 is a perspective view illustrating a battery module manufactured by stacking a plurality of battery cartridges, one of which is shown in FIG. 4.

FIG. 6 is a perspective view typically illustrating a battery module manufactured by stacking a plurality of battery cartridges, one of which is shown in FIG. 4.

Each of the heat dissipation members 500 is partially exposed outward from the corresponding battery cartridges with the result that heat generated from the battery cells 300 during charge and discharge of the battery cells 300 is transferred to the heat dissipation members 500 disposed between the respective battery cartridges 100 and is then discharged to the outside, thereby achieving high heat dissipation efficiency.

INDUSTRIAL APPLICABILITY

As is apparent from the above description, the battery cartridge according to the present invention is configured so that the edge of the battery cell is fixed by the plate-shaped frames in a state in which the sides of the battery cell are open, and the elastic pressing members are mounted at the insides of the frames, thereby enabling the battery cell, having low mechanical strength, to be stably mounted while exhibiting high heat dissipation efficiency and maintaining sealing force even when high pressure is generated in the battery cell.

Also, the ends of the laminate sheets constituting the battery case are sealed from the outside by the elastic pressing members. Consequently, it is possible to prevent external moisture from permeating the battery cell while maintaining insulation resistance, thereby improving safety and service-life characteristics of the battery cell.

In addition, the battery module is configured to have a structure in which the heat dissipation members are disposed respectively between the battery cartridges. Consequently, it is possible to apply various cooling structures to the battery module. Also, it is possible to manufacture the battery module which is generally compact and flexibly changeable in design.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery cartridge having a plate-shaped battery cell mounted therein, wherein the battery cartridge comprises a pair of plate-shaped frames configured to fix opposite sides of the battery cell at the edge thereof in a state in which the sides of the battery cell are open, and each of the frames is provided at the inside thereof, disposed in contact with the edge of the battery cell, with an elastic pressing member configured to press the edge of the battery cell, and wherein the elastic pressing member has a width equivalent to 10 to 80% of the width of each of the frames.

2. The battery cartridge according to claim 1, wherein the battery cell has an electrode assembly mounted in a battery case formed of laminate sheets, and the laminate sheets are thermally welded so that the edge of the battery cell is sealed.

3. The battery cartridge according to claim 2, wherein each of the laminate sheets is a metal laminate sheet comprising an outer covering layer, a metal blocking layer and an inner sealant layer.

4. The battery cartridge according to claim 1, wherein the elastic pressing member is made of a polymer resin exhibiting high elastic pressing force when the elastic pressing member is pressed.

5. The battery cartridge according to claim 4, wherein the elastic pressing member is made of rubber.

6. The battery cartridge according to claim 1, wherein each of the frames is provided at the inside thereof with a groove, in which the elastic pressing member is mounted.

7. The battery cartridge according to claim 1, wherein each of the frames is also provided at the outside thereof with an elastic pressing member.

8. The battery cartridge according to claim 1, wherein each of the frames has one or more coupling through holes.

9. A battery module formed by stacking two or more battery cartridges as set forth in claim 1.

10. The battery module according to claim 9, wherein the battery cartridges have coupling through holes, through which coupling members are inserted to couple the stacked battery cartridges to each other.

11. The battery module according to claim 9, further comprising a heat dissipation member disposed between the battery cartridges.

12. The battery module according to claim 11, wherein the heat dissipation member is formed in the shape of a plate, and at least a portion of the heat dissipation member is exposed outward from the stacked battery cartridges.

13. The battery module according to claim 12, wherein the heat dissipation member is an air cooling type cooling fin or a water cooling type cooling plate.

14. The battery module according to claim 9, wherein the battery module is used as a power source for electric vehicles, hybrid electric vehicles or plug-in hybrid electric vehicles.

15. The battery cartridge according to claim 1, wherein the battery cell comprise a sealed portion formed at at least a portion of the edge thereof, and the elastic pressing member is mounted on each of the frames at a position corresponding to the sealed portion.

16. The battery cartridge according to claim 15, wherein the sealed portion is formed throughout the edge by thermal welding, and the elastic pressing member is mounted on each of the frames in the shape of a closed rectangle.

* * * * *